US011298634B2

(12) United States Patent
Wintermeyer et al.

(10) Patent No.: US 11,298,634 B2
(45) Date of Patent: Apr. 12, 2022

(54) POLYSILOXANE DEFOAMING AGENT

(71) Applicant: BYK-Chemie GmbH, Wesel (DE)

(72) Inventors: Verena Wintermeyer, Wesel (DE); Guillaume Wojciech Jaunky, Wesel (DE); Mirco Süselbeck, Wesel (DE); Mathis Kulessa, Wesel (DE); Daniela Leutfeld, Wesel (DE)

(73) Assignee: BYK-CHEMIE GMBH, Wesel (DE)

( * ) Notice: Subject to any disclaimer, the term of this patent is extended or adjusted under 35 U.S.C. 154(b) by 0 days.

(21) Appl. No.: 16/650,181

(22) PCT Filed: Sep. 25, 2018

(86) PCT No.: PCT/EP2018/075948
§ 371 (c)(1),
(2) Date: Mar. 24, 2020

(87) PCT Pub. No.: WO2019/063538
PCT Pub. Date: Apr. 4, 2019

(65) Prior Publication Data
US 2020/0238199 A1 Jul. 30, 2020

(30) Foreign Application Priority Data
Sep. 27, 2017 (EP) ..................... 17193412

(51) Int. Cl.
*B01D 19/04* (2006.01)
*C09D 7/47* (2018.01)
*C08G 77/26* (2006.01)
*C08G 77/46* (2006.01)
*B05B 9/03* (2006.01)
*B05D 1/02* (2006.01)

(52) U.S. Cl.
CPC ..... *B01D 19/0409* (2013.01); *B01D 19/0413* (2013.01); *B01D 19/0495* (2013.01); *B05B 9/03* (2013.01); *B05D 1/02* (2013.01); *C08G 77/26* (2013.01); *C08G 77/46* (2013.01); *C09D 7/47* (2018.01)

(58) Field of Classification Search
CPC ....... B01D 19/0409; B01D 19/0495; C08G 77/26; C08G 77/46
See application file for complete search history.

(56) References Cited

U.S. PATENT DOCUMENTS

| 3,278,485 | A | 10/1966 | Morgan et al. |
| 5,512,640 | A | 4/1996 | Osawa et al. |
| 5,965,649 | A * | 10/1999 | Kondo ................. A61K 8/898 |
| | | | 424/78.03 |
| 7,605,284 | B2 | 10/2009 | Brueckner et al. |
| 8,153,697 | B2 | 4/2012 | Frank et al. |
| 2011/0218137 | A1* | 9/2011 | Rautschek ........... C08G 77/448 |
| | | | 510/405 |
| 2015/0119524 | A1 | 4/2015 | Mitomi et al. |

FOREIGN PATENT DOCUMENTS

| CN | 102558561 A | 7/2012 | |
| CN | 106281362 A * | 1/2017 | |
| DE | 102005051939 A1 | 5/2007 | |
| EP | 0450900 A1 | 10/1991 | |
| EP | 1634940 A1 * | 3/2006 | ........ C10M 159/005 |
| EP | 2301988 A2 | 3/2011 | |
| EP | 2399570 A1 | 12/2011 | |
| EP | 2725071 A1 | 4/2014 | |
| EP | 2482948 B1 | 4/2016 | |
| GB | 1073312 A | 6/1967 | |
| WO | 2011107397 A1 | 9/2011 | |
| WO | 2012076186 A2 | 6/2012 | |
| WO | 2016001934 A2 | 1/2016 | |

OTHER PUBLICATIONS

Machine Translation of EP1634940A1. Mar. 15, 2006. (Year: 2006).*
Glosz, et al. Siloxanes—Versatile Materials for Surface Functionalisation and Graft Copolymers. Int. J. Mol. Sci. 2020, 21, 6387. (Year: 2020).*
Noria Corporation. Machinery Lubrication: The Lowdown on Oil Breakdown. https://www.machinerylubrication.com/Read/475/oil-breakdown. As viewed on May 10, 2021. (Year: 2021).*
International Search Report and Written Opinion for International Application No. PCT/EP2018/075948 dated Nov. 20, 2018.

* cited by examiner

*Primary Examiner* — Stephen E Rieth
(74) *Attorney, Agent, or Firm* — Fitch, Even, Tabin & Flannery LLP

(57) ABSTRACT

The invention relates to the use of a polysiloxane having a plurality of siloxane groups and at least one tertiary amide group covalently linked as a pending and/or terminal group to the polysiloxane, as a defoaming agent in a liquid composition.

15 Claims, No Drawings

POLYSILOXANE DEFOAMING AGENT

The invention relates to the use of a polysiloxane as a defoaming agent, to a process of preparing a coated substrate, and to a polysiloxane.

Foam is a dispersion of gas in a liquid. In numerous industrial processes, such as in the manufacture and application of inks and paints, in wastewater treatment, in papermaking, in the textile industry and in polymerization, for example, it is necessary to suppress or do away entirely with the unwanted formation of foam during the preparation or processing operations. This can be achieved by adding so-called antifoaming agents, defoaming agents, or defoamers, which are capable, even at very low concentrations, of preventing or destroying unwanted foams. A large number of compound classes has been proposed as defoaming agents, such as silicone oils, mineral oils, hydrophobic polyoxyalkylenes, long-chain alcohols and also mixtures of these products with one another. The activity is frequently boosted by adding what are called hydrophobic solids in amounts of 0.1% to 10% by weight, which specifically promote de-wetting processes on foam lamellae and therefore very actively assist in foam collapse.

U.S. Pat. No. 8,153,697 B describes a defoaming agent for aqueous media comprising a specifc polyamide and a liquid carrier selected from organic oils, mineral oils, and siloxanes. This document is concerned with defoaming agents for aqueous media only.

EP 0450900 A describes N-alkylpyrrolidone-modified siloxane compounds having the characteristics of both silicone and hydrophilic pyrrolidone. The compounds are described as useful in the area of fiber treatment agents, foam stabilizers, and cosmetic additives.

EP2301988 A2 relates to perfluoropolyether-modified polysiloxanes, and to defoaming agents comprising the same. Some of the perfluoropolyether modified polysiloxanes contain a tertiary amide group as a linking group between the perfluoropolyether segment and the polysiloxane segment.

There is an ongoing need for defoaming agents providing improved defoaming properties in coating compositions and other liquid compositions. Organic fluorine compounds have been the subject of discussions relating to environmental persistence and effects on human health. Therefore, it is preferred to use defoaming agents which do not contain organic fluorine compounds.

Frequently, coating compositions are applied by spraying, for example using airless spray guns and air-assisted spray equipment. Upon spray application, enclosed gas bubbles and foam need to be released from the applied coating to obtain a defect-free coating layer. In industrial coating processes, there is a desire to reduce the number of individual coating layers to be applied to a substrate, and to use coating compositions having a low content of volatile organic solvents and high content of non-volatile film forming components. Under such conditions, the coating defects caused by the presence of foam, in particular so-called microfoam, is a serious problem. Microfoam is foam wherein the gas bubbles have a diameter in the range of about 10 to about 70 µm. Known defoaming agents have been found insufficient to prevent microfoam-related coating defects under difficult conditions. The present invention seeks to solve or alleviate the above-mentioned drawbacks.

The invention relates to the use of a polysiloxane having a plurality of siloxane groups and at least one tertiary amide group covalently linked as a pending and/or terminal group to the polysiloxane, as a defoaming agent in a liquid composition. The above-mentioned use may also be described as a process of reducing foam in a liquid composition comprising the step of adding a polysiloxane having a plurality of siloxane groups and at least one tertiary amide group covalently linked to the polysiloxane to the liquid composition.

It has been found that the use of a polysiloxane having a plurality of siloxane groups and at least one tertiary amide group covalently linked as a pending and/or terminal group to the polysiloxane, as a defoaming agent in a liquid composition provides improved defoaming properties. When used in liquid coating compositions, it is possible to apply thick coating layers by spray application with only a low level or even without microfoam related coating defects. The defoaming agent does not require the presence of organic fluorine compounds.

As mentioned above, the polysiloxane has at least one tertiary amide group covalently linked as a pending and/or terminal group to the polysiloxane. In some embodiments, the tertiary amide group is a cyclic amide group. Suitable examples of cyclic tertiary amide groups are those having 4, 5, 6 or seven ring atoms, i.e. β-lactams, γ-lactams, δ-lactams, and ε-lactams. In other embodiments, the at least one tertiary amide group is a non-cyclic amide group. If the polysiloxane has two or more tertiary amide groups covalently lined to it, the individual amide groups may be of the same or of different types. In some embodiments, the polysiloxane has a plurality of cyclic tertiary amides covalently linked to it. In other further embodiment, the polysiloxane has a plurality of non-cyclic tertiary amides linked to it. In a still further embodiment, the polysiloxane has cyclic and non-cyclic tertiary amide groups linked to it. However, it is also possible to use a mixture of polysiloxanes, for example of a first polysiloxane having one or more cyclic tertiary amides linked to it, and a second polysiloxane having one or more non-cyclic tertiary amides linked to it.

The pending and/or terminal tertiary amide groups may be positioned along the polysiloxane chain at various positions. In some embodiments, the at least one tertiary amide group is covalently linked to the polysiloxane as a terminal group at the end of a polysiloxane chain. Alternatively, or additionally, the at least one tertiary amide groups is covalently linked to the polysiloxane at a non-terminal position. A polymer morphology wherein several tertiary amide groups are pending from a polysiloxane chain at different positions may also be referred to as a comb polymer.

In some embodiments, the polysiloxane may also have primary or secondary amide groups covalently linked to it. However, it is generally preferred that the content of primary and secondary amide groups is low. Generally, the content of non-tertiary amide groups in the polysiloxane is in the range of 0.0 to 10.0 mole %, calculated on the number of tertiary amide groups. It is preferred that the polysiloxane is free or essentially free of non-tertiary amide groups. The polysiloxane is considered essentially free of non-tertiary amide groups when the content of non-tertiary amide groups is in the range of 0.0 to 2.0 mole %, calculated on the number of tertiary amide groups. In a preferred embodiment, the number of non-tertiary amide groups does not exceed 5.0 mole %, calculated on the number of tertiary amide groups. The polysiloxane having a plurality of siloxane groups generally has 1 to 15 tertiary amide groups covalently linked to it. In a preferred embodiment, 1 to 10, and more preferred 2 to 7 tertiary amide groups are covalently linked to the polysiloxane. In some embodiments, a mixture of polysiloxanes having different numbers of tertiary amide groups can be employed. If such mixtures are employed, the number of tertiary amide groups relates to the average number of tertiary amide groups.

The polysiloxane having a plurality of siloxane groups and at least one tertiary amide group covalently linked as a pending and/or terminal group to the polysiloxane can be prepared according to known methods. In one embodiment, the compounds in question are prepared by a hydrosilylation reaction, wherein a polysiloxane having a plurality of siloxane groups and at least one Si—H group is reacted with a tertiary amide compound having an ethylenically unsaturated group. Such reactions are generally catalyzed by metal based catalysts. Details of such hydrosilylation reactions and suitable conditions are generally known. Suitable examples are, among others, described in Examples 2 to 4 of EP 0450900. Hydrosilylation catalysts employed are preferably noble metals and their compounds, such as platinum, rhodium, and palladium and their compounds, more preferably platinum compounds. Especially preferred platinum compounds are hexachloroplatinic acid, alcoholic solutions of hexachloroplatinic acid, complexes with platinum and aliphatic, unsaturated hydrocarbon compounds; and platinum-vinylsiloxane complexes. It is also possible, however, to use platinum black and platinum on activated carbon. If, for example, a platinum compound is used, 1 to 50 ppm as platinum metal are preferably used.

The hydrosilylation takes place typically under the following conditions: The SiH-functional polysiloxane is introduced into the reactor at room temperature. Then, under a nitrogen atmosphere, the contents of the reactor are heated for example to 85° C. to 140° C. A hydrosilylation catalyst is added, such as Karstedt catalyst or one of the other aforementioned catalysts. Depending on the anticipated exothermic nature of the reaction, some or all of the ethylenically unsaturated component is added. The exothermic reaction which then proceeds raises the temperature. Normally attempts are made to maintain the temperature within a range from 90° C. to 120° C. If some some or all of the ethylenically unsaturated component is metered in, the addition is made in such a way that the temperature remains in the range from 90° C. to 120° C. Following complete addition, the temperature is maintained for some time at 90° C. to 120° C. The progress of the reaction may be monitored by gas-volumetric determination of the remaining SiH groups or by infrared spectroscopy (absorption band of the silicon hydride at 2150 cm$^{-1}$). If necessary, an alcoholic gelling inhibitor as described in U.S. Pat. No. 5,512,640 may be added. The polysiloxanes of the invention preferably contain no residual Si—H groups.

Specific examples of ethylenically unsaturated tertiary amides which are suitable for the preparation of polysiloxanes used according to the invention are N-vinyl-2-pyrrolidone, N-vinylcaprolactam, N-allyl-2-pyrrolidone, acrylic- and methacrylic esters of hydroxyl-functional lactams, such as the acrylic ester of 1-(3-hydroxypropyl)-2-pyrrolodone or of 1-(2-hydroxyethyl)-2-pyrrolidone, and acrylic amides of the general formula $CH_2=CH—C(=O)—NR^1_2$, wherein $R^1$ is independently selected from $C_1$ to $C_{12}$ alkyl groups, preferably from $C_1$ and $C_2$ alkyl groups.

When the polysiloxane having a plurality of siloxane groups and at least one tertiary amide group covalently linked to the polysiloxane is prepared by a hydrosilylation reaction of an ethylenically unsaturated tertiary amide, the covalent link between the polysiloxane and the at least one tertiary amide group contains the group —Si—$CR^2_2$—$CR^2_2$—, wherein the $R^2$ groups independently represent hydrogen or an organic group, and wherein at least one $R^2$ represents hydrogen.

Alternatively, the polysiloxanes used according to the invention can be prepared by reaction of a polysiloxane having a plurality of siloxane groups and at least one Si—H group with a tertiary amide compound having a hydroxyl group. Such reactions can be described as dehydrogenative condensation reactions. They are suitably catalyzed by metal complexes. This reaction type is described in German patent application DE 102005051939 A.

Examples of suitable acyclic tertiary amides having a hydroxyl group are amides of carboxylic acids having a hydroxyl group. Specific examples are amides of lactic acid, such as the dimethyl-, diethyl, di-n-propyl, and di-isopropyl amide of lactic acid. Examples of suitable cyclic tertiary amides having a hydroxyl group include N-(2-hydroxyethyl)-pyrrolidone, N-(2-hydroxypropyl)-pyrrolidone, N-(2-(2-hydroxy-ethoxy)ethyl)pyrrolidone, N-(2-hydroxyethyl)-caprolactam, N-(2-hydroxypropyl)-caprolactam and N-(2-(2-hydroxyethoxy)ethyl)-caprolactam.

When the polysiloxane having a plurality of siloxane groups and at least one tertiary amide group covalently linked to the polysiloxane is prepared by a dehydrogenative condensation reaction with a tertiary amide compound having a hydroxyl group, the covalent link between the polysiloxane and the at least one tertiary amide group contains the group —Si—O—CHR—, wherein R represents hydrogen or an alkyl group. In a further aspect, the invention relates to polysiloxane having a plurality of siloxane groups and at least one tertiary amide group covalently linked to the polysiloxane, and wherein the covalent link between the polysiloxane and the at least one tertiary amide group contains the group —Si—O—CHR—, and wherein R represents hydrogen or an alkyl group.

If so desired, it is possible to combine the above-described synthetic routes, for example by reacting one part of the SiH groups with an ethylenically unsaturated tertiary amide, and a further part with a tertiary amide having a hydroxyl group.

Both synthetic routes described above require a polysiloxane having a plurality of siloxane groups and at least one Si—H group as starting material. Suitable polysiloxane having at least one Si—H group can be represented by the following general formula (I)

$$M_a M'_b D_c D'_d T_e Q_f \tag{I}$$

wherein
M represents $[R_3SiO_{1/2}]$
M' represents $[R_2SiHO_{1/2}]$
D represents $[R_2SiO_{2/2}]$
D' represents $[RSiHO_{2/2}]$
T represents $[RSiO_{3/2}]$
Q represents $SiO_{4/2}]$
a is an integer of 0 to 10, preferably 0 to 2, more preferably 2,
b is an integer of 0 to 10, preferably 0 to 2, more preferably 0,
c is an integer of 0 to 500, preferably 2 to 300, more particularly 5 to 250,
d is an integer of 0 to 100, preferably 0 to 50, more particularly 0 to 30,
e is an integer of 0 to 10, preferably 0 to 5, more particularly 0,
f is an integer of 0 to 10, preferably 0 to 5, more particularly 0, with the proviso that a+b≥2 and b+d≥1, preferably ≥2, R independent of each other represents a $C_1$ to $C_{30}$ hydrocarbon radical, preferably methyl, octyl or phenyl, (α-methyl)styryl, more preferably methyl.

The description of polysiloxanes using M, D, T and Q units is generally know in the art. It is described in detail in the textbook Silicone Surfactants, Series: Surfactant Science, Published: Jul. 13, 1999 by CRC Press, Editor: Randall M. Hill, page 8.

If so desired, the polysiloxane having a plurality of siloxane groups and at least one tertiary amide group covalently linked to the polysiloxane can be prepared by other suitable synthetic routes, for example by condensation reactions of tertiary amide-functional alkoxysilanes, such as described in EP 0450900, in particular Example 1 of this document.

The polysiloxane can be linear or branched. Generally, the polysiloxane has 1 to 15 SiH groups, preferably 1 to 10, and more preferably 2 to 7 SiH groups. Generally, the polysiloxane has 4 to 70 Silicon atoms, preferably 10 to 50 silicon atoms.

The number average molecular weight of the polysiloxane having a plurality of siloxane groups and at least one tertiary amide group covalently linked to the polysiloxane generally is within the range of 300 to 15000 g/mol, preferably 500 to 10000 g/mol, and even more preferably 800 to 8000 g/mol.

The number average molecular weight can be determined by gel permeation chromatography carried out at 22° C. using a separation module Waters 2695 and a refractive index detector Waters 2414. Toluene is a suitable eluent, using polydimethylsiloxane standards for calibration.

Optionally, the polysiloxane having a plurality of siloxane groups and at least one tertiary amide group covalently linked as a pending and/or terminal group to the polysiloxane can have additional structural segments. Such optional segments may be included to adjust and fine-tune the compatibility with the systems wherein they are employed, and other properties of the polysiloxane. Examples of such optional segments are polyether segments, for example based on polyethylene oxide and/or polypropylene oxide, polyester segments, hydrocarbon segments, fluorinated hydrocarbon segments, and polyurethane segments. These optional segments may be connected to the polysiloxane backbone by hydrosilylation or dehydrogenative condensation, as described above for tertiary amides. In a preferred embodiment, the polysiloxane comprises at least one polyether segment, which is present as a terminal group or as a pendant group. The polyether segment typically has an average of at least three ether groups.

It is preferred that the polysiloxane having a plurality of siloxane groups and at least one tertiary amide group covalently linked as a pending and/or terminal group to the polysiloxane has no hydroxyl groups or a low content of hydroxyl groups.

It is further preferred that the polysiloxane having a plurality of siloxane groups and at least one tertiary amide group covalently linked as a pending and/or terminal group to the polysiloxane does not contain fluorinated organic groups.

In many embodiments the polysiloxane having a plurality of siloxane groups and at least one tertiary amide group covalently linked as a pending and/or terminal group to the polysiloxane is a liquid. It can be used according to the invention and included in liquid compositions as such as 100% substances. If so desired, the polysiloxane can also be diluted with an organic solvent prior to including it in a liquid composition.

In a still further embodiment, the polysiloxane can be included in the liquid composition as an aqueous or non-aqueous emulsion or dispersion. The liquid composition preferably contains the polysiloxane in an amount to achieve effective defoaming properties. The specific amount depends on the foaming tendency of the composition and the degree of defoaming which is required. Generally, the liquid composition contains the polysiloxane in an amount of from 0.001 to 10.000 wt.-%, preferably of from 0.010 to 8.000 wt.-%, more preferably of from 0.050 to 7.000 wt.-% or of from 0.060 to 6.000 wt.-% or of from 0.080 to 5.000 wt.-%, in particular of from 0.100 to 2.000 wt.-%, based in each case on the total weight of the composition.

The activity of the tertiary amide-modified polysiloxane may be boosted by adding so-called hydrophobic solids or particles in amounts of 0.1% to 10% by weight, calculated on the weight of the polysiloxane, which specially promote dewetting processes on foam lamellae and therefore very actively assist in foam collapse. Suitable hydrophobic solids are silicas, metal stearates, polyolefins and waxes, ureas and urea derivatives, and polyamides or polyamide derivatives.

According to the invention, the polysiloxane having at least one tertiary amide group can be used as a defoaming agent in a variety of liquid compositions. Typically, the liquid composition has a viscosity at 20° C. in the range of 10 to 50000 mPas, measured in accordance with DIN 53019 T1. A suitable instrument is a Haake Roto Visko 1 using a 035/1° cone and a split of 0.050 mm. The viscosity is the average of measurements in the range of 0 to 600 oscillations per second.

The liquid composition may be an aqueous or a non-aqueous liquid composition. An aqueous composition comprises water as the primary liquid diluent. A non-aqueous liquid composition may comprise a liquid binder or a liquid pre-polymer. Alternatively or additionally, a non-aqueous liquid composition may comprise a reactive diluent, or a volatile or non-volatile organic solvent to liquefy the composition and to achieve the desired viscosity. In a preferred embodiment, the liquid composition is a non-aqueous composition. In a non-aqueous composition water is not the primary liquid diluent. Preferably, a non-aqueous composition comprises a low amount of water. However, small amounts of water may be present in a non-aqueous composition, for example water may be introduced by pigments or fillers, which have water absorbed on their surface. Generally, a non-aqueous composition comprises water in an amount of 0.0 to 5.0% by weight, preferably 0.0 to 2.0% by weight, calculated on the total weight of the composition.

Non-limiting examples of the liquid composition include a coating composition, a molding composition, a curable pre-polymer composition, a cosmetic formulation, and the like. Further examples of liquid compositions are a pigment paste, a sealant formulation, a ceramic formulation, an adhesive formulation, a potting compound, a building material formulation, a lubricant, a spackling compound in the form of a spray agent, for example of what is called a deposition aid in crop protection products, a printing ink or another ink, for example of an inkjet ink.

In many embodiments, the liquid composition comprises an organic polymeric binder or a pre-polymer. The binder may have crosslinkable functional groups. Any customary crosslinkable functional group known to the skilled person is contemplated here. More particularly the crosslinkable functional groups are selected from the group consisting of hydroxyl groups, amino groups, carboxylic acid groups, and unsaturated carbon double bonds, isocyanates, polyisocyanates, and epoxides such as ethylene oxides. The systems generally include systems on the basis of unsaturated polyesters, epoxy, polyurethane or dissolved acrylate resins. The applications include fiber-reinforced plastics (FRP, CFRP), mold construction, roof coating/floor covering, electrical insulation systems and polymer concrete.

The liquid composition may comprise one or more customarily employed components and further additives. Further additives are preferably selected from the group consisting of emulsifiers, flow control assistants, solubilizers, stabilizing agents, preferably heat stabilizers, process stabilizers, and UV and/or light stabilizers, catalysts, waxes, flexibilizers, flame retardants, reactive diluents, adhesion promoters, organic and/or inorganic nanoparticles having a particle size <100 nm, process aids, plasticizers, fillers, glass fibers, reinforcing agents, additional wetting agents and dispersants, light stabilizers, ageing inhibitors and mixtures of the aforesaid additives. The liquid compositions optionally comprise organic or inorganic pigments, as well as fillers such as calcium carbonate, aluminium hydroxide, reinforcing fibres such as glass fibres, carbon fibres and aramid fibres. The tertiary amide-modified polysiloxane may be combined with other defoamers such as silicone oils, mineral oils, polyether-modified silicones, long-chain alcohols, hydrophobic polymers such as polyoxyalkylenes, polyalkylvinylethers, polyalkylacrylates etc. but mot limited thereto. Also, mixtures of these products with one another and emulsions thereof can be provided.

In a further aspect, the invention relates to a process of preparing a coated substrate, comprising the steps of
i) providing a liquid coating composition comprising a polysiloxane having a plurality of siloxane groups and at least one tertiary amide group covalently linked as a pending and/or terminal group to the polysiloxane, in an amount of 0.001 to 5.000% by weight, calculated on the total weight of the composition, and
ii) applying the liquid coating composition to a substrate.

In a preferred embodiment of the process, the liquid coating composition is applied to a substrate by spraying using a spraying device. A suitable example of a spraying device is an airless spray gun. The liquid coating composition may be a pigmented or unpigmented composition.

The liquid coating composition may be applied to any substrate. Examples of suitable substrates include buildings or parts thereof, transportation vehicles or parts thereof, and infrastructural constructions, such as bridges. Examples of transportation vehicles include passenger cars, airplanes, trucks, delivery vans, buses, ships, as well as agricultural and earth moving machines. The substrate may be pre-coated or uncoated when the liquid coating composition is applied to it. In some embodiments, the substrate may be pre-coated with a primer coating, for example an anti-corrosive primer in the case of metal substrates.

The use of the polysiloxane as defoamer can be exploited to full advantage when the coating composition is applied in a relatively high dry layer thickness, which otherwise would be prevented by the presence of foam or microfoam. It is therefore preferred that the coating composition is applied in a dry layer thickness of at least 50 µm, more preferably least 60 µm. The dry layer thickness is the layer thickness of the applied coating composition after evaporation of any volatile diluent and after curing. The dry layer thickness mentioned above relates to the layer thickness which is applied in one step without an intermediate drying step.

In a preferred embodiment, the process of the invention comprises the further step of drying and/or curing the applied coating composition. During this step any volatile liquid diluent can evaporate from the applied coating. This process is generally referred to as drying of the coating composition. If the coating composition comprises a binder and/or curing agent having crosslinkable functional groups, crosslinking can occur as well. This process is generally referred to as curing. Drying and/or curing can conducted at ambient temperature, for example in the range of 5 to 40° C. Alternatively, drying and/or curing can be conducted at elevated temperature, for example in the range of 40 to 250° C. It is also possible to have a first drying step at ambient temperature, followed by curing at elevated temperature. In a still further embodiment, curing is triggered by actinic radiation, for example UV light or electron beam radiation.

EXAMPLES

Preparation of Polysiloxanes Having Tertiary Amide Groups as a Pending and/or Terminal Group Example 1

A 500 ml flask equipped with a stirrer, reflux condenser, thermometer, dropping funnel and water separator was flushed with nitrogen and then charged with 64.7 g of xylene and 125.0 g of a methylhydrosiloxane of mean average formula $M^H D14M^H$. The water separator was filled with xylene. Under a nitrogen atmosphere, the solution was heated up to 120° C. At this temperature, 0.18 g of zinc acetyl acetonate was added into the reactor. Thereafter, the mixture was heated up to 155° C. Afterwards, 26.96 g of 1-(2-hydroxyethyl)-2-pyrrolidon was dosed into the flask within 140 minutes. The mixture was stirred at 155° C. for 30 minutes and was then distilled at 150° C. and 15 mbar using a rotary evaporator.

The molecular weight of the substance was Mw=2157 g/mol and polydispersity=2.33, measured by GPC.

Example 2

A 500 ml flask equipped with a stirrer, reflux condenser, thermometer, dropping funnel and water separator was flushed with nitrogen and them charged with 65.0 g xylene and 135 g of a methylhydrosiloxane of mean average formula $M^H D24M^H$. The water separator was filled with xylene. Under nitrogen atmosphere, the solution was heated up to 120° C. At this temperature, 0.18 g of zinc acetyl acetonate was filled into the reactor. Thereafter, the mixture was heated up to 155° C. Afterwards, 17.7 g of 1-(2-hydroxyethyl)-2-pyrrolidon was dosed into the flask within 140 minutes. The mixture was stirred at 155° C. for 30 minutes and was then distilled at 150° C. and 15 mbar using a rotary evaporator.

The molecular weight of the substance was Mw=3216 g/mol and polydispersity=2.19, measured by GPC.

Example 3

A 500 ml flask equipped with a stirrer, reflux condenser, thermometer, dropping funnel and water separator was flushed with nitrogen and then charged with 127.6 g xylene and 250 g of a methylhydrosiloxane of mean average formula $M^H D_{14} M^H$.

The water separator was filled with xylene. Under nitrogen atmosphere, the solution was heated up to 120° C. At this temperature, 0.36 g of zinc acetyl acetonate was filled into the reactor. Thereafter, the mixture was heated up to 155° C. Afterwards, 48.90 g of N,N-Dimethyl lactamide was dosed into the flask within 140 minutes. The mixture was stirred at 140° C. for 30 minutes and was then distilled at 150° C. and 15 mbar using a rotary evaporator.

The molecular weight of the substance was Mw=2818 g/mol and polydispersity=2.14, measured by GPC.

Example 4

A 500 ml flask equipped with a stirrer, reflux condenser, thermometer, dropping funnel and water separator was flushed with nitrogen and them charged with 65.1 g xylene and 120 g of a methylhydrosiloxane of mean average formula $MD^H{}_2{,}3\ D_{10}M$. The water separator was filled with xylene. Under nitrogen atmosphere, the solution was heated up to 120° C. At this temperature, 0.18 g of zinc acetyl acetonate was filled into the reactor. Thereafter, the mixture was heated up to 140° C. Afterwards, 32.92 g of N,N-Dimethyl lactamide was dosed into the flask within 140 minutes. The mixture was stirred at 140° C. for 30 minutes and was then distilled at 150° C. and 15 mbar using a rotary evaporator.

The molecular weight of the substance was Mw=4025 g/mol and polydispersity=3.28, measured by GPC.

Example 5

A 500 ml flask equipped with a stirrer, reflux condenser, thermometer and dropping funnel was flushed with nitrogen and then charged with 125 g of a methylhydrosiloxane of mean average formula $M^H D_{14} M^H$ and 0.08 g 2,6-Di-tert-Butyl-4-Methyl-Phenol. Under nitrogen atmosphere, the solution was heated up to 80° C. At this temperature, 0,004 g of Platinum-Divinyltetramethyldisiloxane-Complex (Pt-DVTMD) were filled into the reactor and 22.82 g of N-Vinylcaprolactam were dosed within 60 minutes into the flask. Thereafter, the mixture was heated up to 100° C. At this temperature, 0.002 g of 1,3-Divinyltetramethyldisiloxane were filled into the reactor. After 120 minutes reaction time, the mixture was heated up to 110° C. and 0.002 g of Pt-DVTMD were filled into the reactor. After additional reaction time of 120 minutes, the mixture was distilled at 150° C. and 15 mbar using a rotary evaporator.

The molecular weight of the substance was Mw=2132 g/mol and polydispersity=1.82, measured by GPC.

Example 6

A 500 ml flask equipped with a stirrer, reflux condenser, thermometer, dropping funnel and water separator was flushed with nitrogen and then charged with 117.0 g xylene and 222.0 g of a methylhydrosiloxane of mean average formula $M^H D24 M^H$. The water separator was filled with xylene. Under nitrogen atmosphere, the solution was heated up to 120° C. At this temperature, 0.16 g of zinc acetyl acetonate was filled into the reactor. Thereafter, the mixture was heated up to 155° C. Afterwards, 24.4 g of a ethylene oxide/propylene oxide based polyether alcohol of average formula $CH_3$-4.3 EO/5.1 PO—OH (random) was dosed into the flask within 30 minutes. The mixture was stirred at 155° C. for 30 minutes. After that the mixture was cooled down to 140° C. Afterwards 24.4 g of 1-(2-hydroxyethyl)-2-pyrrolidon was dosed into flask within 15 minutes. The mixture was stirred at 140° C. for 30 minutes. The volatiles were distilled off at 140° C. and 15 mbar using a rotary evaporator. The molecular weight of the residue was Mw=3370 g/mol and polydispersity=2.16, measured by GPC.

Comparative Example 1

A 500 ml flask equipped with a stirrer, reflux condenser, thermometer and water separator was flushed with nitrogen and charged with 100 g of a methylhydrosiloxane of mean average formula $MD^H{}_{2.3}\ D_{10}M$ and 0.079 g 2,6-Di-tert-Butyl-4-Methyl-Phenol. Under nitrogen atmosphere, the solution was heated up to 60° C. At this temperature, 0.003 g Platinum-Divinyltetramethyldisiloxane-Complex (Pt-DVTMD) were filled into the reactor. Afterwards, 81.36 g of allyl-3PO—OH are dosed into the flask within 20 minutes. The mixture was stirred at 60° C. for 30 minutes and was then distilled at 150° C. and 15 mbar using a rotary evaporator. The molecular weight of the substance was Mw=2071 g/mol and polydispersity=3.22, measured by GPC.

Comparative Example 2: Preparation of a Defoamer According to EP 2482948 B1

A 500 mL-flask equipped with a stirrer, reflux condenser, thermometer and water separator was flushed with nitrogen and then charged with 156.5 g of polypropylene glycol having a number average molar mass Mn of 2000 g/mol, 43.2 g of oleic acid, 0.2 g of dibutyltin dilaurate, 0.2 g of triphenylphosphite and 16.00 g of xylene. The mixture was heated to 240° C. with stirring under a blanket of nitrogen within two hours. Water was removed by azeotropic distillation at 240° C. and under atmospheric pressure until an acid number of less than 15 mgKOH/g was reached. The mixture was then distilled at 150° C. and 15 mbar using a rotary evaporator. A liquid reaction product having a mass fraction of solids of 99% and a dynamic viscosity of 380 mPa·s. was obtained.

Comparative Sample 3

Tego Airex 990 is a commercial defoaming agent for airless/airmix application ex Evonik. Its formulation is described as being based on deaerating organic polymers, with a tip of polydimethylsiloxane. It is recommended for clear and pigmented coatings.

Preparation of a Pigmented White Topcoat for Airless Application and Description of Airless Application 35 g of an acrylic resin (Synthalat A 086HS, Synthopol), 9.3 g solvents (4.0 g Butyl acetate; 5.3 g Xylene), 1.5 g Dispersing Additive (Disperbyk-110, BYK) and 0.5 g Rheology additive (Garamite 7305, BYK) were mixed. 10 g of white pigment (TiPure R 960, Chemours), 17 g fillers (6.0 g Luzenac 20M2, Imerys Minerals; 6.0 g Bariumsulfate EWO, Huntsman; 5.0 g Millicarb OG, Omya) and 9 g anti-corrosive fillers (8.0 g Heucophos SAPP, Heubach; 1.0 g Heucorin RZ, Heubach) were added with stirring. The mixture was grinded by dissolver with 6 cm tooth-blade for 20 minutes at 40° C. at 7000 rpm.

After grinding, 15.4 g of the acrylic resin (Synthalat A 086HS, Synthopol), 1.9 g of solvents (1.0 g Butyl acetate; 0.9 g Butylglycol acetate) and a surface additive (BYK-310, BYK) were added to the mixture. The mixture was stirred by dissolver with 6 cm tooth-blade for 5 minutes at 2000 rpm.

The mixture was filtered over a 210 μm sieve.

The defoaming agents of Examples 1-5 and Comparative Examples 1-3 were incorporated by dissolver with tooth-blade for 3 minutes at 25° C. at 1865 rpm. For each defoaming agent two concentrations were tested, namely 0.5 and 1.0% by weight.

After storage overnight, 12.3 g hardener (Desmodur N 3390, Covestro) and 18 g solvent (Butyl acetate) were incorporated by stirring with a spatula.

Application was done by Sata spray mix 3000, 192 bar paint pressure, 3350 nozzle on primed steel panels. The coated substrates were stored vertically for drying at room temperature.

After complete drying the panels were judged visually in terms of foam (on a scale from 1=no foam to 5=severe foam), microfoam (on a scale from 1=no microfoam to 5=severe microfoam), levelling (on a scale from 1=good levelling to 5=bad levelling) and craters (on a scale from 1=no craters to 5=severe craters).

The results are summarized in Table 1

TABLE 1

| Defoamer (concentration) | Foam | Micro-foam | Levelling | Craters |
|---|---|---|---|---|
| None | 5 | 5 | — | — |
| Example 1 (0.5%) | 2 | 3-4 | 1-2 | 1 |
| Example 1 (1.0%) | 1-2 | 2 | 1 | 1 |
| Example 2 (0.5%) | 2 | 3 | 1 | 1 |
| Example 2 (1.0%) | 1-2 | 2 | 1 | 1 |
| Example 5 (0.5%) | 2-3 | 3 | 2-3 | 1 |
| Example 5 (1.0%) | 3-4 | 3-4 | 3 | 1 |
| Example 6 (0.5%) | 2-3 | 2 | 1 | 1 |
| Example 6 (1.0%) | 2 | 1-2 | 1 | 1 |
| Comparative example 1 (0.5%) | 5 | 5 | 5 | 1 |
| Comparative example 1 (1.0%) | 4-5 | 4 | 5 | 1 |
| Comparative example 2 (0.5%) | 5 | 5 | 3 | 1 |
| Comparative example 2 (1.0%) | 5 | 4-5 | 3 | 1 |
| Comparative example 3 (0.5%) | 4 | 4-5 | 5 | 1 |
| Comparative example 3 (1.0%) | 4 | 4-5 | 5 | 3 |

From Table 1 it can be inferred that coating compositions wherein defoaming agents are used according to the invention exhibit better defoaming properties than the compositions wherein defoaming agents according to the state of the art are used at the same concentrations. Furthermore, the coating compositions according to the invention exhibit improved levelling properties, and the cratering behavior is not negatively impacted.

Description of Draw Down Test

A part of the paint with hardener was also applied on glass panels to measure the gloss and haze values.

After complete drying the presence of craters was determined visually on a scale from 1=no craters to 5=severe craters. The results are summarized in Table 2.

TABLE 2

| Defoamer (concentration) | Gloss 20° | 60° | Haze | Craters |
|---|---|---|---|---|
| None | 54 | 85 | 380 | 1 |
| Example 1 (0.5%) | 52 | 85 | 375 | 1 |
| Example 1 (1.0%) | 52 | 84 | 345 | 1 |
| Example 2 (0.5%) | 51 | 85 | 365 | 1 |
| Example 2 (1.0%) | 50 | 83 | 360 | 1 |
| Example 3 (0.5%) | 56 | 88 | 360 | 1 |
| Example 3 (1.0%) | 55 | 86 | 300 | 1 |
| Example 4 (0.5%) | 57 | 88 | 360 | 1 |
| Example 4 (1.0%) | 58 | 88 | 340 | 1 |
| Example 5 (0.5%) | 60 | 88 | 300 | 1 |
| Example 5 (1.0%) | 57 | 84 | 286 | 1 |
| Example 6 (0.5%) | 56 | 88 | 320 | 1 |
| Example 6 (1.0%) | 57 | 89 | 310 | 1 |
| Comparative example 1 (0.5%) | 57 | 88 | 370 | 1 |
| Comparative example 1 (1.0%) | 55 | 87 | 360 | 1 |
| Comparative example 2 (0.5%) | 57 | 88 | 370 | 1 |
| Comparative example 2 (1.0%) | 57 | 89 | 370 | 1 |
| Comparative example 3 (0.5%) | 58 | 89 | 370 | 1 |
| Comparative example 3 (1.0%) | 59 | 89 | 360 | 1 |

From Table 2 it can be inferred that gloss, haze and cratering of the coatings prepared from the coating compositions according to the invention are not negatively impacted, as compared to the use of comparative defoaming agents.

Description of Foam Volume (Density) Test.

A 50 g sample of paint without hardener was stirred for one minute by dissolver tooth-blade and immediately after stirring filled into a metric cylinder, which was placed on a scale. To calculate the density the weight was divided by the volume. The results are summarized in Table 3.

TABLE 3

| Defoamer (concentration) | Density in g/cm$^3$ |
|---|---|
| None | 0.94 |
| Example 1 (0.5%) | 1.06 |
| Example 1 (1.0%) | 1.06 |
| Example 2 (0.5%) | 1.10 |
| Example 2 (1.0%) | 1.15 |
| Example 3 (0.5%) | 1.13 |
| Example 3 (1.0%) | 1.12 |
| Example 4 (0.5%) | 1.13 |
| Example 4 (1.0%) | 1.17 |
| Example 5 (0.5%) | 1.06 |
| Example 5 (1.0%) | 1.08 |
| Comparative example 1 (0.5%) | 0.85 |
| Comparative example 1 (1.0%) | 0.89 |
| Comparative example 2 (0.5%) | 0.93 |
| Comparative example 2 (1.0%) | 0.92 |
| Comparative example 3 (0.5%) | 0.97 |
| Comparative example 3 (1.0%) | 0.93 |

From Table 3 it can be inferred that the density after stirring of the coating compositions according to the invention is higher than the density of comparative coating compositions with a defoaming agent according to the state of the art. This indicates improved defoaming properties of the inventive compositions.

Preparation of Clear Coat and Description of Application Test

A mixture of 82.1 g of an acrylic binder ((Synthalat A 086HS, Synthopol), 8.9 g Butyl acetate, 7.4 g Xylene and 1.6 g Butyl glycol acetate were mixed by dissolver for 5 minutes at 2000 rpm.

The defoamer (Example 1-3 and 5 and comparative example 1-3) was incorporated by dissolver with tooth-blade for 3 minutes at 25° C. at 1865 rpm.

Application was done by Sata spray mix 3000, 192 bar paint pressure, 3350 nozzle on primed steel panels. The metal substrates were stored vertically for drying at room temperature.

After complete drying the panels were judged visually in terms of foam (on a scale from 1=no foam to 5=severe foam), microfoam (on a scale from 1=no microfoam to 5=severe microfoam), levelling (on a scale from 1=good levelling to 5=bad levelling), craters (on a scale from 1=no craters to 5=severe craters), pinholes (on a scale from 1=no pinholes to 5=severe pinholes) and clouds (on a scale from 1=no clouds to 5=severe clouds).

The results are summarized in Table 4.

| Defoamer (concentration) | Foam | Micro-foam | Level-ling | Craters | Pinholes | Clouds |
|---|---|---|---|---|---|---|
|  | 4 | 3-4 | 5 | 1 | 5 | 1 |
| Example 1 (0.5%) | 2 | 2-3 | 3 | 1 | 3 | 2 |
| Example 1 (1.0%) | 1-2 | 2 | 2 | 1 | 2 | 2 |
| Example 2 (0.5%) | 2-3 | 3-4 | 2-3 | 1 | 3 | 4 |
| Example 2 (1.0%) | 1-2 | 2 | 2-3 | 1 | 3 | 2-3 |
| Example 3 (0.5%) | 2-3 | 3 | 2-3 | 1 | 3 | 3 |
| Example 3 (1.0%) | 2 | 3 | 2-3 | 1 | 3 | 3 |
| Example 5 (0.5%) | 1-2 | 1-2 | 1 | 1 | 2 | 1-2 |
| Example 5 (1.0%) | 1-2 | 1-2 | 1 | 1 | 2 | 1-2 |
| Comp. example 1 (0.5%) | 3-4 | 3-4 | 4-5 | 1 | 4 | 4 |
| Comp. example 1 (1.0%) | 3-4 | 3-4 | 4-5 | 1 | 4 | 4 |
| Comp. example 2 (0.5%) | 5 | 5 | — | 1 | 5 | 3-4 |
| Comp. example 2 (1.0%) | 5 | 5 | — | 1 | 5 | 3 |
| Comp. example 3 (0.5%) | 4 | 4 | 5 | 1 | 4-5 | 3-4 |
| Comp. example 3 (1.0%) | 5 | 5 | 5 | 1 | 5 | 3-4 |

From Table 4 it can be inferred that the coatings from the compositions according to the invention exhibit less foaming, better levelling, less pinholes and less clouds than the coatings containing defoaming agents according to the state of the art. There is no negative influence on crater formation.

Description of Foam Volume (Density) Test

A 50 g sample of paint without hardener was stirred for 1 min by dissolver tooth-blade and immediately after stirring filled into a metric cylinder, which was placed on a scale. To calculate the density the weight was divided by the volume. The results are summarized in Table 5.

TABLE 5

| Defoamer (Concentration) | Density in g/cm$^3$ |
|---|---|
|  | 0.75 |
| Example 1 (0.5%) | 0.85 |
| Example 1 (1.0%) | 0.85 |
| Example 2 (0.5%) | 0.90 |
| Example 2 (1.0%) | 0.93 |
| Example 3 (0.5%) | 0.90 |
| Example 3 (1.0%) | 0.91 |
| Example 4 (0.5%) | 0.93 |
| Example 4 (1.0%) | 0.93 |
| Example 5 (0.5%) | 0.86 |
| Example 5 (1.0%) | 0.85 |
| Comparative example 1 (0.5%) | 0.74 |
| Comparative example 1 (1.0%) | 0.73 |
| Comparative example 2 (0.5%) | 0.75 |
| Comparative example 2 (1.0%) | 0.76 |
| Comparative example 3 (0.5%) | 0.76 |
| Comparative example 3 (1.0%) | 0.80 |

From Table 5 it can be inferred that the density after stirring of the coating compositions according to the invention is higher than the density of comparative coating compositions with a defoaming agent according to the state of the art. This indicates improved defoaming properties of the inventive compositions.

The invention claimed is:

1. A process comprising: adding a polysiloxane to a non-aqueous liquid composition, the polysiloxane including a plurality of siloxane groups and 2 to 7 covalently linked tertiary amide groups as pending and/or terminal groups, wherein the polysiloxane does not contain fluorinated organic groups and has a number average molecular weight in the range of 800 to 8000 g/mol, wherein the polysiloxane is added to the non-aqueous liquid composition in an amount effective to reduce or eliminate foaming within a coating formed by spray application of the non-aqueous liquid composition.

2. The process according to claim 1, wherein the tertiary amide group is a cyclic amide group.

3. The process according to claim 1, wherein the tertiary amide group is a non-cyclic amide group.

4. The process according to claim 1, wherein a covalent link between the polysiloxane and the 2 to 7 covalently linked tertiary amide groups contains the group —Si—O—CHR—, and wherein R represents hydrogen or an alkyl group.

5. The process according to claim 1, wherein the polysiloxane further comprises a pending and/or terminal polyether segment.

6. The process according to claim 1, wherein the polysiloxane contains between 0.0 and 10.0 mole % of non-tertiary amide groups, calculated on the number of tertiary amide groups.

7. The process according to claim 1, wherein the amount of polysiloxane added to the non-aqueous liquid composition ranges from 0.100 to 2.000 wt.-%, based on the total weight of the non-aqueous liquid composition and the polysiloxane.

8. The process according to claim 1, wherein the non-aqueous liquid composition is a coating composition.

9. The process according to claim 1, wherein the non-aqueous liquid composition is a curable pre-polymer composition.

10. The process according to claim 1, further comprising spraying the non-aqueous liquid composition.

11. The process according to claim 1, further comprising coating a substrate with the non-aqueous liquid composition.

12. A process of preparing a coated substrate, the process comprising:
providing a non-aqueous liquid coating composition comprising a polysiloxane including a plurality of siloxane groups and 2 to 7 covalently linked tertiary amide groups as pending and/or terminal groups, wherein the polysiloxane does not contain fluorinated organic groups and has a number average molecular weight in the range of 800 to 8000 g/mol, wherein the polysiloxane is included in an amount effective to reduce or eliminate foaming within a coating formed by spray application of the non-aqueous liquid coating composition, and
applying the non-aqueous liquid coating composition to a substrate to provide a dry layer thickness of at least 50 μm.

13. The process according to claim 12, wherein applying the non-aqueous liquid coating composition to the substrate comprises spraying of the non-aqueous liquid coating composition using a spraying device.

14. The process according to claim 13, wherein the spraying device is an airless spray gun.

15. The process according to claim 12, wherein the substrate is a transportation vehicle or a part thereof.

\* \* \* \* \*